(12) United States Patent
Li

(10) Patent No.: US 9,075,987 B2
(45) Date of Patent: Jul. 7, 2015

(54) METHODS AND COMPUTING DEVICES FOR PASSWORD VERIFICATION

(71) Applicant: Liang Li, Shenzhen (CN)

(72) Inventor: Liang Li, Shenzhen (CN)

( * ) Notice: Subject to any disclaimer, the term of this patent is extended or adjusted under 35 U.S.C. 154(b) by 51 days.

(21) Appl. No.: 13/872,187

(22) Filed: Apr. 29, 2013

(65) Prior Publication Data

US 2013/0298223 A1    Nov. 7, 2013

(30) Foreign Application Priority Data

May 7, 2012    (CN) .......................... 2012 1 0140372

(51) Int. Cl.
   *G06F 21/46*    (2013.01)
   *G06F 21/31*    (2013.01)

(52) U.S. Cl.
   CPC ................ *G06F 21/46* (2013.01); *G06F 21/31* (2013.01)

(58) Field of Classification Search
   None
   See application file for complete search history.

(56) References Cited

U.S. PATENT DOCUMENTS

| 5,428,349 | A  | * | 6/1995 | Baker ........................ 340/5.54 |
| 5,932,859 | A  | * | 8/1999 | Ijichi et al. ................... 235/380 |
| 6,108,791 | A  | * | 8/2000 | Lee et al. ........................ 726/18 |
| 7,735,124 | B2 | * | 6/2010 | Lin et al. ........................... 726/7 |
| 8,726,371 | B2 | * | 5/2014 | Toebes et al. ................... 726/19 |
| 8,819,810 | B1 | * | 8/2014 | Liu ................................. 726/18 |
| 2004/0054929 | A1 | * | 3/2004 | Serpa ........................... 713/202 |
| 2008/0099556 | A1 | * | 5/2008 | Park .......................... 235/382.5 |
| 2011/0047608 | A1 | * | 2/2011 | Levenberg ...................... 726/7 |
| 2012/0124656 | A1 | * | 5/2012 | Senac ............................. 726/9 |

* cited by examiner

*Primary Examiner* — Gilberto Barron, Jr.
*Assistant Examiner* — Wayne An
(74) *Attorney, Agent, or Firm* — Mei & Mark LLP

(57) ABSTRACT

A method for password verification comprises a first verification step for verifying a password that is input at least one time with a first preset password; and a second verification step for verifying the password that is input in another round with a second preset password when the password input in the first verification step is determined to be incorrect. The number of digits of the second preset password is larger than that of the first preset password.

14 Claims, 3 Drawing Sheets

METHODS AND COMPUTING DEVICES FOR PASSWORD VERIFICATION

PRIORITY

This application claims the benefit of priority of Chinese Patent Application 201210140372.5 filed on May 7, 2012, the content of which is incorporated herein by reference.

TECHNICAL FIELD

The present disclosure relates to methods and devices for password verification, in particular to methods and devices for verifying a password whose length needs to be varied.

BACKGROUND

Techniques with password verification have been widely used nowadays, providing some security for corresponding operations. Generally speaking, a longer password provides higher security. Although a long password provides high security, it is inconvenient for a user to memorize and input it. A short password is not safe and is easy to be decoded, resulting in password discovery.

SUMMARY

To solve the aforementioned problems, the present disclosure provides the following methods and devices.

The present disclosure provides a method for password verification, comprising a first verification step for verifying a password that is input at least one time with a first preset password; and a second verification step for verifying the password that is input in another round with a second preset password when the password input in the first verification step is determined to be incorrect. The number of digits of the second preset password is larger than that of the first preset password.

The present disclosure also provides a method for password verification on a computing device, the computing device comprising a processor, a memory, and an algorithm stored in the memory for executing the method by the processor. The method comprising steps of: receiving an input password; comparing the input password to a preset password; and when the input password does not match the preset password, requiring a second input password that is longer than the preset password.

The present disclosure further provides a method for password verification on a computing device, the computing device comprising a processor, a memory, and an algorithm stored in the memory for executing the method by the processor. The method comprises steps of: (1) repeatedly receiving a password input by a user and verifying the password with a preset password until the input password matches the preset password or the number of inputs reaches a preset maximum number of inputs; (2) when the number of inputs reaches the preset maximum number of inputs, elongating the preset password by a preset number of digits; (3) repeatedly receiving an input password and verifying the password with the elongated preset password until the input password matches the elongated preset password or the number of inputs reaches the preset maximum number of inputs; (4) when the number of inputs reaches the preset maximum number of inputs, repeating steps (2) and (3) until the input password matches the elongated preset password or the number of repetitions of the steps (2) and (3) reaches a preset maximum number of repetitions.

In addition, the present disclosure also provides a computing device comprising a processor, a memory, and an algorithm stored in the memory for execution by the processor. The algorithm executes a method comprising steps of: (1) repeatedly receiving an input password and verifying the password with a preset password until the input password matches the preset password or the number of inputs reaches a preset maximum number of inputs; (2) when the number of inputs reaches the preset maximum number of inputs, elongating the preset password by a preset number of digits; (3) repeatedly receiving an input password and verifying the password with the elongated preset password until the input password matches the elongated preset password or the number of inputs reaches the preset maximum number of inputs; (4) when the number of inputs reaches the preset maximum number of inputs, repeating steps (2) and (3) until the input password matches the elongated preset password or the number of repetitions of the steps (2) and (3) reaches a preset maximum number of repetitions.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

Figure 1:
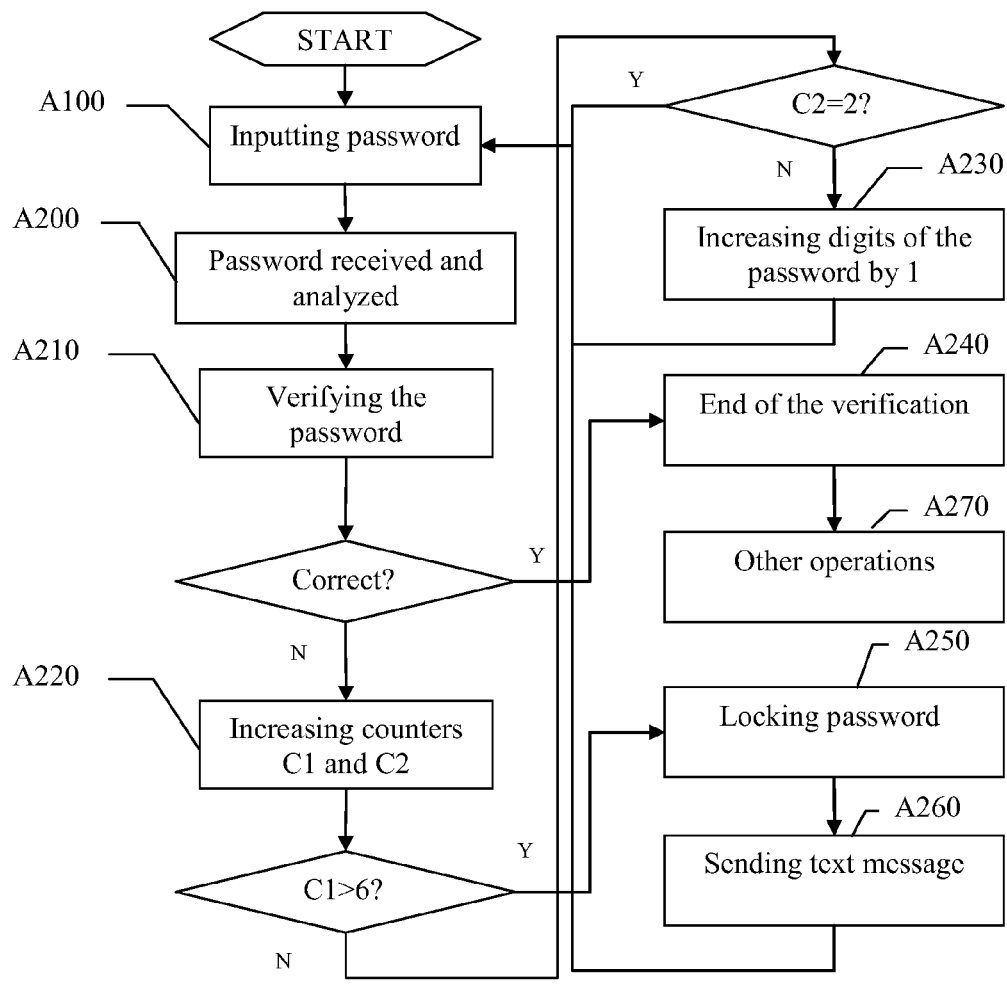
FIG. 1 illustrates a password verification procedure according to one embodiment.

References will now be made in detail to the present exemplary embodiments, examples of which are illustrated in the accompanying drawings. Wherever possible, the same reference numbers will be used throughout the drawings to refer to the same or like parts. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

To solve the problem that a long password is difficult to memorize and a short password is easy to be decoded, the present disclosure provides a method for password verification, comprising: a first verification step for verifying a password that is input at least one time with a first preset password; and a second verification step for verifying the password that is input in the next round with a second preset password if the password input in the first verification step is determined to be incorrect. The number of digits of the second preset password is larger than that of the first preset password.

As an improvement to the above method, the method further includes a third verification step for verifying the password that is input in the next round with a third preset password if the password input in the second verification step is determined to be incorrect. There can be fourth, fifth, and sixth verification steps, and the digits of the password can be increased more and more.

As an improvement to the above method, in the first and second verification steps, the allowed number of password inputs is predetermined. The allowed number can be 1 or more for a round of inputs.

As an improvement to the above method, the second preset password comprises the characters of the first preset password and one or more new characters. The added new character can be located at the front, middle, or end of the whole password according to rules that can be freely set by the user or the system.

As an improvement to the above method, when the input password is incorrect, the system indicates to the user the number of digits of the password for the next round of inputs, or the number of digits of the password for the current round, or the number of the rounds in which the inputs were incorrect. The user can predict the current password based on the indicated information and previous settings.

As an improvement to the above method, the user can set the number of the rounds for allowed password input. The password is locked when the user inputs exceed the number of the rounds. Further input by the user is invalid. There can be many types of locking, among which are temporary locking and long-term locking For temporary locking, the user can input the password after some time. For long-term locking, the user cannot input the password until he unlocks the locking according to rules.

As an improvement to the above method, when the input keyboard is not fixed, the position for the password input can be varied for each input. For example, the input keyboard can be rendered on a touch screen. In this case the position of the input keyboard can be varied for each input. This prevents others from figuring out the password by peeking at the positions of the inputs.

As an improvement to the above method, a restoring password that restores the length of the password can be set. The length of the password is restored to the length in the first round after the restoring password is correctly input in a specified region.

As an improvement to the method described above, if the length of the input password exceeds that of the first preset password, only the part of the input password corresponding to the length of the set password is verified, while other part of the input password does not affect the verification. For, example, if the preset password is 123, and the password input by the user is 12345678, the input is still correct. The other part of the input password is used against peeking In this way, a short password will not be readily peeked and figured out. It can be used in a situation where there are strangers around and the user does not feel safe. The correct input positions for the password can also be conveniently set according to set conditions.

As another improvement to the method described above, the first preset password has 2 digits. The 2-digit password for the first round of inputs simultaneously attends to safety and convenience.

As a further improvement to the method described above, when the number of attempted inputs exceeds a predetermined maximum number of inputs, the user will be notified through a text message or email sent to the address pre-registered by the user. In this way, the user will be notified of the incorrect password inputs and take proper action if the incorrect inputs were not done by the user himself.

According to one embodiment of the method for password verification of the present disclosure, a user sets a relatively long original password, and the password for the first round of verification is a short part at the front of the original password. In this way, only a small part of the original password needs to be input. After incorrect inputs, the length of the password will be increased. The added part of the password can also be a part of the relatively long original part. The password can be increased sequentially until it becomes the same as the original password.

New characters can be added to the password according to certain rules, the new characters can be related to the original password or it can be added according to certain rules that are not related to the original password. The user can set a short password that can be easy to memorize. After incorrect inputs, the length of the password will be increased according to predetermined rules. In this way, the password will become stronger and stronger, and more difficult to be decoded. In the above, only one input is allowed for each round. As a matter of fact, based on different situations, several inputs can be allowed in one round of inputs. The advantage of the method disclosed in the present disclosure is: the user can input a password with relative few digits for verification, If the user input is incorrect and the number of inputs exceeds the preset maximum number of inputs, the user needs to input a new password with more digits than the one input previously, until the user inputs the correct password with the right digit or the password is locked; if the user can input the correct short password in the first time, the system determines the password is verified to be correct. The user finds it convenient to memorize the short password, and needs to input longer and longer passwords with incorrect inputs. Because anyone other than the user does not know the rules to increase the length of the password and yet the length of the password keeps increasing, the password is highly unlikely to be decoded. In this way, the problem in prior art that a long password is difficult to memorize and a short password is easy to be decoded is solved. Moreover, the user can set the rules of increasing the length of the password and thus predict what the password with increased length is solved.

Below are some specific embodiments.

<Embodiment 1>

A shortest password to be input for the first time is set in a system. A user can select the number of digits friendly to his memory. As an example, the digits of the shortest password can 6. The number of allowed incorrect inputs is set as 2. That is to say, one round of inputs includes two inputs. That is, as to a password with a certain number of digits, if two inputs are incorrect, a password with the number of digits increased according to certain rules must be input during the next round of inputs (i.e., the third and fourth inputs). For example, for each round of inputs, the password will be elongated 1 digit relative to the password that was input during the previous round. The rule is that the number of digits for the password is progressively increased starting from the shortest password. The maximum number of inputs is 6. That is to say, after 6 incorrect inputs, the password is locked, any further input is invalid.

FIG. 1 illustrates the password verification procedure according to the above embodiment.

A100. A password is input by a user according to the indication at the interface of the system.

A200. The processor of the system receives the password that is input by the user and analyzes the password.

A210. The processor compares the password input by the user with the correct verification password (this verification password varies on conditions), if each digit is correct, the password verification procedure is ended, the processor switches into A240 and the device may perform other operations at A270. Otherwise go to A220.

A220. The password input by the user is incorrect, the general verification counter (counter C1) increases by 1, the verification counter (counter C2) for the password of the same number of digits is increased by 1. It is checked whether the counter C1 exceeds 6. If it does, the processor switches to a step A250 to lock the password, then to a step A260 to send a text message to a user. If the counter C1 does not exceed 6, it is checked whether the counter C2 for the password of the same number of digits in the same round of inputs is equal to 2. If it is, the processor switches to the step A100 to allow another password input. Otherwise go to step A230.

A230. The input for the password of a certain number of digits is invalid, the length for the verification password increases by 1 (that is, the user needs to input a password that has one more digit than the password he had to input previously) and then the processor switches to the step A100 as described previously.

A240. The whole password verification process ends, the processor switches to the step A270 to enable the device to perform other operations.

A250. The password is locked. That is, any input by the user is invalid.

A260. The system automatically sends a text message with the verification information to a pre-registered phone number of the user. The user will receive the correct password after replying to the verification information, and the process switches to the step the step A100 as described previously.

A270. Other operations.

Below is an example of the embodiment.

1. A shortest password 123456 is set. If a "123456" is input, the verification process determines it is correct. If any digit or the number of digits is incorrect, the verification process determines it is incorrect.

2. The user continues to input a password with 6 digits. If the user input is correct, the verification process determines it is correct. If the user input is incorrect, the number of inputs of the 6-digit password has reached 2, the system will indicate to the user that it is no longer valid to input a 6-digit password and he needs to input a password with the number of digits increased by 1, which is 1234567.

3. The user goes on to input a 7-digit password. If two inputs are incorrect the system will indicate to the user that it is no longer valid to input a 7-digit password and he needs to input a password with the number of digits increased by 1, which is 12345678.

4. The user goes on to input an 8-digit password. If two inputs are incorrect the system indicates to the user that the total number of inputs has reached 6, and the password is locked. In other words, after 6 incorrect inputs, any further input is invalid.

5. The system automatically sends a text message with the verification information to a pre-registered phone number of the user, and the user will receive the correct password after replying to the verification information.

The shortest password "123456" described above is a part of a preset original password 12345678. In practice, a shorter password, such as 1, 12, 123, or 1234, can be set as the shortest password. And the length of the password can be progressively increased upon incorrect inputs on certain conditions.

<Embodiment 2>

A shortest password to be input for the first time is set in a system, and the user can select the number of digits friendly to his memory. As an example, the length of the shortest password can be set to 6. The number of allowed incorrect inputs is set to 1 (one round of inputs allows one input). That is, as to a password with a certain number of digits, if one input is incorrect, a password with the number of digits increased according to certain rules must be input during the next input. Each time, the password will be increased by 1 digit. And the rule is that the number of digits for the password is progressively increased starting from the shortest password. The maximum number of inputs is in this example is 7. That is, after 7 incorrect inputs, the password is locked, and any further input is invalid.

Figure 2:
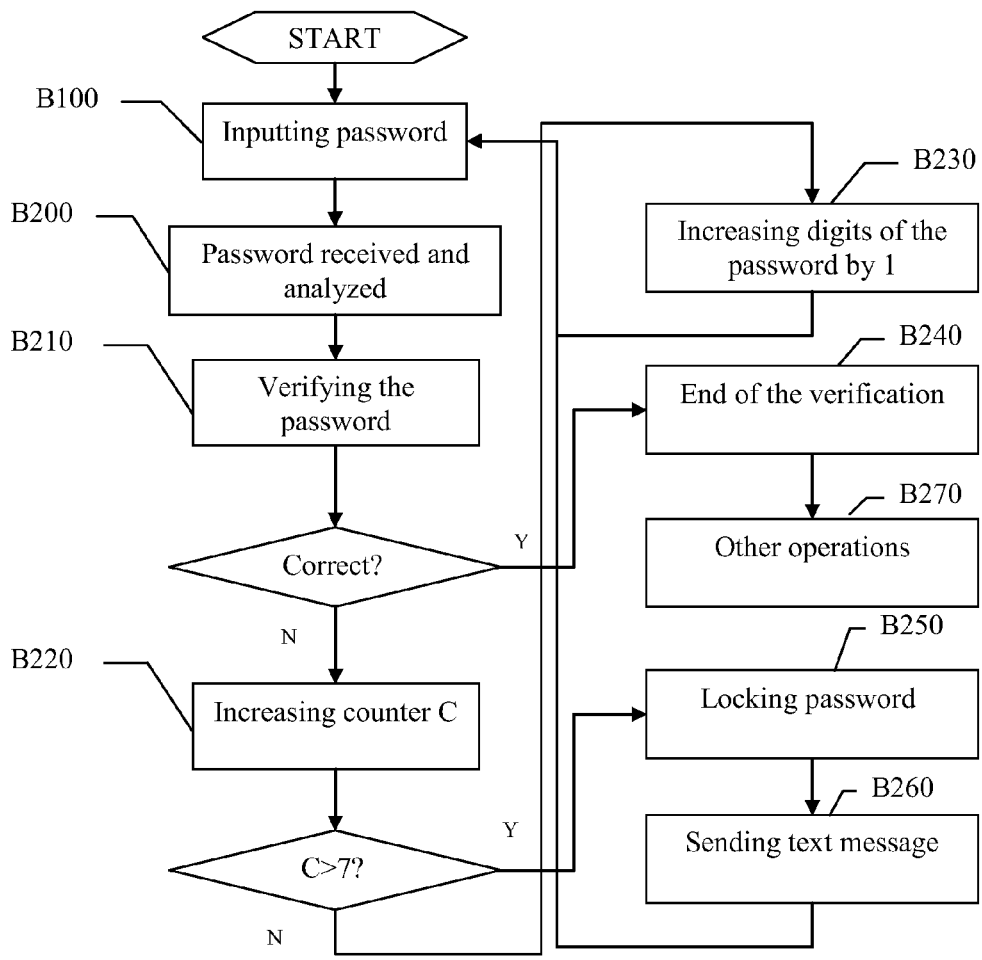
FIG. 2 illustrates a password verification procedure according to a second embodiment.

FIG. 2 illustrates the password verification procedure according to the embodiment.

B100. A password is input by the user according to the indication at the interface of the system.

B200. The processor of the system receives the password input by the user and analyzes the password.

B210. The processor compares the password input by the user with the correct verification password (this password varies on conditions). If each digit is correct, the password verification procedure is ended, the processor will switch into B240. Otherwise go to B220.

B220. The password input by the user is incorrect, the verification counter C is increased by 1. It is checked whether the counter C exceeds 7. If it does, the processor switches to a step B250. Otherwise go to B230.

B230. The input for the password of a certain number of digits is invalid. The user needs to input a password that has one more digit than the password he had to input previously, and the processor switches to the step B100 for re-entry of a password input.

B240. The password verification process ends, the processor switches to other operations.

B250. The password is locked. That is, any further input by the user is invalid.

B260. The system automatically sends a text message with the verification information to a pre-registered phone number of the user. The user will receive the correct password after replying to the verification information, and the process switches to the step B100.

B270. The device may perform other operations.

Below is an example of the above verification procedure.

1. A shortest password 123456 is set. If a "123456" is input, the verification process determines it is correct. But, if any digit or the number of digits is incorrect, the verification process determines it is incorrect.

2. If the password input by the user is incorrect, the system indicates to the user that it is no longer valid to input a 6-digit password, and the user needs to input a 7-digit password, which is 1234566.

3. If the user incorrectly inputs a 7-digit password, the system indicates to the user that it is no longer valid to input a 7-digit password, and the user needs to input an 8-digit password, which is 12345665.

4. The user inputs an 8-digit password. If the user input is correct, the verification process determines it is correct. But if the user input is incorrect, it is no longer valid to input any 8-digit password, and the user needs to input a 9-digit password, which is 123456654.

5. The user inputs a 9-digit password. If the user input is correct, the verification process determines it is correct. But if the user input is incorrect, the system indicates to the user that it is no longer valid to input any 9-digit password, and the user needs to input a 10-digit password, which is 1234566543.

6. The user inputs a 10-digit password. If the user input is correct, the verification process determines it is correct. But if the user input is incorrect, the system indicates to the user that it is no longer valid to input any 10-digit password, and the user needs to input an 11-digit password, which is 12345665432.

7. The user inputs an 11-digit password. If the user input is correct, the verification process determines it is correct. But if the user input is incorrect, the system indicates to the user that it is no longer valid to input any 11-digit password, and the user needs to input a 12-digit password, which is 123456654321.

8. The user inputs a 12-digit password. If the user input is correct, the verification process determines it is correct. But if the user input is incorrect, the system indicates to the user that 7 incorrect inputs have been made, and the password is locked.

9. The system automatically sends a text message with the verification information to a pre-registered phone number of the user, and the user will receive the correct password after replying to the verification information.

In the verification process of the above embodiment, the original password set by the user is 123456. Upon incorrect inputs in the process, the length of the password can be increased according to certain rules. In practice, it can be increased to 123456654321123456654321, 123456123456123456123456123456, and the like.

<Embodiment 3>

A shortest password to be input for the first time is set in a system, and a user can select the number of digits friendly to his memory. The length of the shortest password can be set to 3, and the length of the original password is 6. The technique in the prior art usually asks the user to input the whole original password. The number of allowed incorrect user inputs is set to 1. That is, as to a password with the same number of digits, if one input is incorrect, a password with the number of digits increased according to certain rules must be input during the next input. Each time, the password will be increased by 3 digits. The rule is that the numbers between 1-9 are repeatedly added to the shortest password. The maximum number of inputs is 6. That is, after 6 incorrect inputs, the password is locked, and any further input is invalid.

Figure 3:
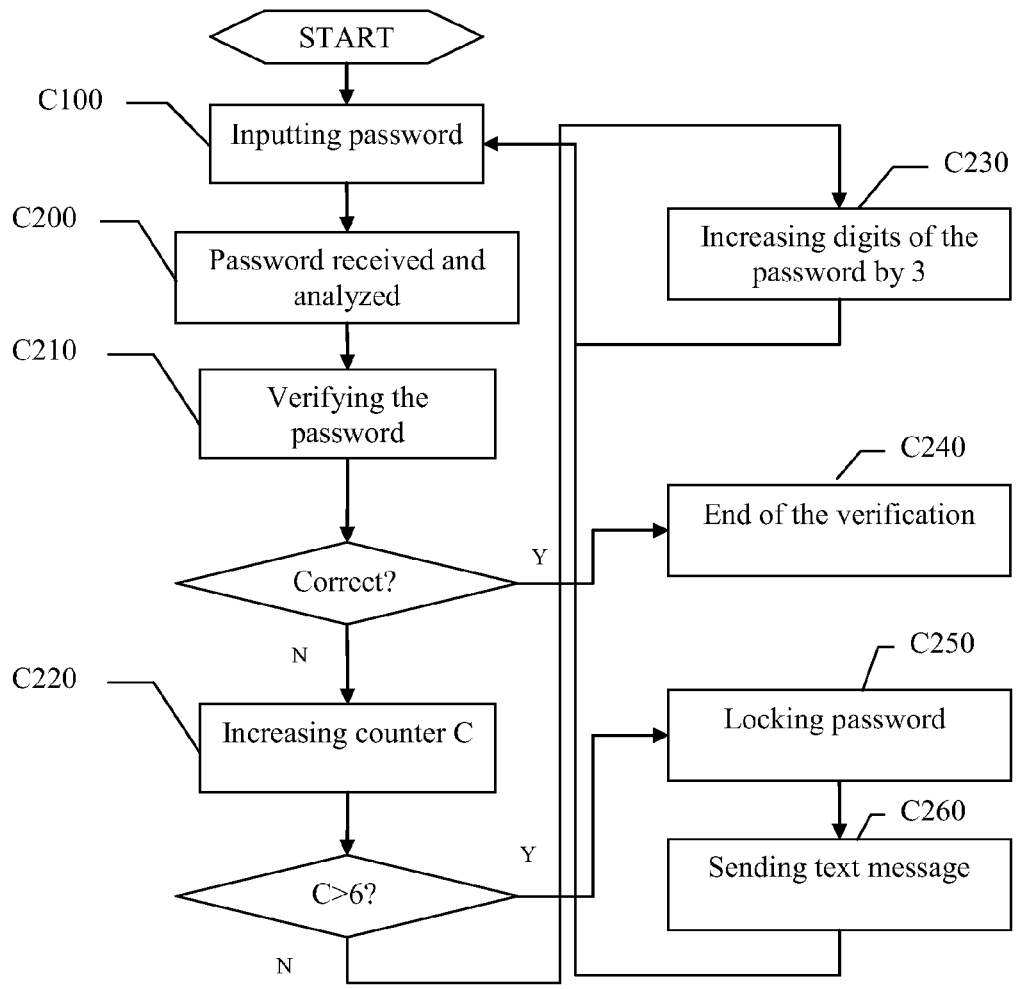
FIG. 3 illustrates a password verification procedure according to a third embodiment.

FIG. 3 illustrates the password verification procedure according to the embodiment.

C100. A password is input by a user according to the indication at the interface of the system.

C200. The processor of the system receives the password input by the user and analyzes the password after the user hits the ENTER key.

C210. The processor compares the password input by the user with the correct verification password (this password varies on conditions). If each digit is correct, the password verification procedure is ended, and the processor will switch into C240. Otherwise go to C220.

C220. The password input by the user is incorrect, and the verification counter C is increased by 1. It is checked whether the counter C exceeds 6. If it does, the processor switches to a step C250. Otherwise go to C230.

C230. The input for the password of the same number of digits is invalid, and the user needs to input a password that has 3 more digits. That is, the length of the correct password is increased by 3 digits, and the processor switches to the step C100 to for another password input.

C240. The password verification process ends, after which the processor may switch to other operations.

C250. The password is locked. That is, any input by the user is invalid.

C260. The system automatically sends a text message with the verification information to a pre-registered phone number of the user, the user will receive the correct password after replying to the verification information, and the process switches to the step C100 for input of a password.

Below is a specific example of the above verification procedure:

1. A shortest password 123 is set (the original password is 123456, the shortest password is only part of the original password). If a "123" is input in the first time, the verification process determines it is correct. If any digit or the number of digits is incorrect, the verification process determines it is incorrect.

2. The user needs to input a 3-digit password. If the user input is correct, the system determines that it is correct. If the password input by the user is incorrect, the system indicates to the user that the password has been incorrectly input once. The correct password to be input next time is 123456; that is, the verification password is 123456.

3. The user inputs a 6-digit password. If the user input is correct, the system determines that it is correct. But if the user input is incorrect, the system indicates to the user that the password has been incorrectly input twice, and the correct password to be input next time is 123456123.

4. The user inputs a 9-digit password. If the user input is correct, the system determines that it is correct. But if the user input is incorrect, the system indicates to the user that the password has been incorrectly input three times, and the correct password to be input next time is 123456123456.

5. The user inputs a 12-digit password. If the user input is correct, the system determines that it is correct. But if the user input is incorrect, the system indicates to the user that the password has been incorrectly input 4 times, and the correct password to be input next time is 123456123456789.

6. The user inputs a 15-digit password. If the user input is correct, the system determines that it is correct. But if the user input is incorrect, the system indicates to the user that the password has been incorrectly input 5 times, and the correct password to be input next time is 123456123456789123.

7. The user inputs an 18-digit password. If the user input is correct, the system determines that it is correct. But if the user input is incorrect, the system indicates to the user that the password has been incorrectly input 6 times, the password is locked.

8. The system automatically sends a text message with the verification information to a pre-registered phone number of the user, and the user will receive the correct password after replying to the verification information.

<Embodiment 4>

The password for the first round of input in the system is two digits, for this example, 12 (it can also be 34). The password for the second round of input is a long one: 34567890123. If the user inputs a password "12" in the first round of input, the system determines that the input is correct and executes other operations after the password verification. If the input in the first round is incorrect, the second round of password verification will be carried out. If the user fails to input the correct password for the preset number of times in the second round, the system will lock the password or execute other operations. The number of allowed user inputs for the first round can be the same with or different from that for the second round. If the first round allows two inputs, two incorrect inputs will make the system enter into the second round with a longer password. Since a long password has higher security, more user inputs can be allowed. For example, 5 user inputs can be allowed. If the user inputs the password incorrectly for 5 times, the system will lock the password or execute other operations, or execute the operation of increasing the length of the password, similar to the previous embodiments.

In the first round of inputs in the above embodiments, the system can remind the user of the allowed number of user inputs, or of the information that the password to be input is the original password or a short password. In the second round of inputs, the system can also remind the user of the allowed number of user inputs, or of the information that the password to be input is the original password or a short password.

The embodiment (and other embodiments) can be applied to setting and verification of passwords for email, cell phones, computers, bank accounts, safeties, messengers (MSN, QQ), website registrations, and etc. For example, it is inconvenient to input the password each time when one logs in for emails, yet it is not safe for the email system to store the password and let the user log in without inputting the password. Using a shortened password therefore is not only safe but also convenient. Taking a password for turning on a cell phone or a computer as another example, a long password is very inconvenient, yet no password means low safety, which might result in leak of information to others. Using of a short password such as a 1-digit or 2-digit one for the first round of verification enhances the safety to some extent. There are many rules for setting a short password. The short password can be a fixed one, a variable one, or the combination thereof. An example of the fixed password is 12 (or 34) as shown in the previous embodiment. A variable password can be set according to the date. For example, if today is the $12^{th}$ day of a certain month, the short password is then 12, and tomorrow the password will become 13. During variation of the password, certain numbers can be included, or the numbers themselves can be fixed or variable. For example, the password can be added with the day of the week, and the date and the day are appended together for the password. An example of the combination of fixed and variable passwords is a 2-digit password, the first digit is a fixed "1", and the second digit varies according the day of the week or month. In this way, the password can be: 11, 12, 13, 14, 15, 16, 17, 11, 12, 13, 14, 15 ... which cycle goes on and on. This type of password is also characterized in that its length is increased according to certain rules. Taking the password "12" as the example, after incorrect inputs, the password becomes "123", and after further incorrect inputs, it becomes "1234". The change of the length of the password after incorrect inputs will alert the user, who will notice whether it is himself that did the incorrect inputs or it is another person who was attempting to decode the password.

For the short password, there are limits on the allowed user inputs for each round of inputs, which gives very high security. Merely Roman letters include A, B, C, D, E, F, G, H, I, J, K, L, M, N, O, P, Q, R, S, T, U, V, W, X, Y, Z, a, b, c, d, e, f, g, h, i, j, k, l, m, n, o, p, q, r, s, t, u, v, w, x, y, z, and other characters and number, such as 0, 1, 2, 3, 4, 5, 6, 7, 8, 9 can also be used. Accordingly, the probability of inputting the correct password in 1 or 2 attempts is very low. Moreover, the password will be varied after incorrect inputs. The aforementioned passwords therefore have both good convenience and security.

In the method for password verification according to the present disclosure, the user can input a password with relatively few digits for verification. If the user input is incorrect and the number of inputs exceeds a preset number, the user needs to input a new password with more digits than the one input previously, until the user inputs the correct password with the right digit or the password is locked. If the user can input the correct short password in the first time, the system determines the password is verified to be correct. The user finds it convenient to memorize the short password, and needs to input longer and longer passwords with more and more incorrect inputs. Because anyone other than the user does not know the rules to increase the length of the password and yet the length of the password keeps increasing, the password is highly unlikely to be decoded. Moreover, the present disclosure provides a way against peeking Although the current password is short, the password can be very long and only a part of it is effective with other characters used for confusion. The effective part can be located at the front, middle, or end of the whole password according to the setting of the user or the system. In this way, the problem in prior art that a long password is difficult to memorize and a short password is easy to be decoded is solved. Moreover, the user can set the rules of increasing the length of the password and thus predict what the password with increased length is. When the user finds that the correct password differs from what he predicts, he knows if it was someone else who was inputting the incorrect password and attempts to decode the password. In this way, the user can take proper measure, which increases the strength of the password.

It can happen that the length of the password has been increased to be very long, and it is not feasible for the user to input a password that long. In this case, a certain mode can be provided, which allows the user to input a new password or the original password, and the password will be restored to the original length after verification. Or the password will be restored to the original length or usual length after some time.

The aforementioned embodiments of the password verification method can be implemented by the CPU or an on-board chip of an electronic device with a touch screen. The CPU or the on-board chip can comprise at least circuitry, memory, and processor for storing the algorithms and data for carrying out steps as described above. The CPU or the on-board chip can communicate with the displayer of the electronic device to display the indication as well as other information. The circuitry, memory and processor of the CPU or the on-board chip can be shared with other devices of the electronic device or exclusive to the various steps of the unlocking methods as described above. Exclusivity would require additional hardware, while sharing would require appropriate allocation programming. In either case, stored data and algorithms can be fed to a processor for computational processing to implement steps of the unlocking method.

In the preceding specification, various preferred embodiments have been described with reference to the accompanying drawings. It will, however, be evident that various other modifications and changes may be made thereto, and additional embodiments may also be implemented, without departing from the broader scope of the invention as set forth in the claims that follow.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

I claim:

1. A method for password verification, comprising:
   a first verification step for verifying a password that is input at least one time with a first preset password; and
   a second verification step for verifying the password that is input in another round with a second preset password when the password input in the first verification step is determined to be incorrect,
   wherein both the first preset password and the second preset password contain one or more consecutive digits of the password and the number of digits of the second preset password is larger than that of the first preset password, wherein the second preset password comprises the characters if the first preset password and the new characters, and wherein, when the input password is incorrect, the system indicates to the user one of the numbers of digits of the password for the next round of inputs, or the number of digits of the password for the current round, or the number of the rounds in which the inputs were incorrect.

2. The method according to claim 1, wherein the method further includes a third verification step for verifying the password that is input in another round with a third preset password when the password input in the second verification step is determined to be incorrect.

3. The method according to claim 1, wherein, in the first and second verification steps, the allowed number of password inputs is predetermined.

4. The method according to claim 1, wherein the user sets the number of the rounds for allowed password inputs; and the password is locked when the inputs exceed the number of the rounds and further input is invalid.

5. The method according to claim 1, wherein when the input keyboard is not a fixed device, the position for the password input is varied for each input.

6. The method of claim 1, wherein the input keyboard is rendered at one of several positions on a touch screen, and the position of the input keyboard is varied among the several positions for each input.

7. The method according to claim 1, wherein a restoring password is set to restore the length of the password to the length of the first preset password, so that when the restoring password is correctly input in a specified region, the length of the password is restored to the length of the first preset password.

8. The method according to claim 1, wherein during the verification steps, when the length of the input password exceeds that of the first preset password, only the part of the input password corresponding to the length of the preset password is verified, and the other part of the input password does not affect the verification.

9. The method according to claim 1, wherein the first preset password has 2 digits.

10. A method for password verification on a computing device, the computing device comprising a processor, a memory, and an algorithm stored in the memory for executing the method by the processor, the method comprising steps of:
   receiving an input password;
   comparing the input password to a preset password; and
   when the input password does not match the preset password, requiring a second input password that is longer than the preset password for comparison with a second preset password, wherein both the first preset password and the second preset password contain one or more consecutive digits of a password,
   wherein the second preset password comprises the characters of the first preset password and new characters, and
   wherein, when the input password is incorrect, the computing device indicates to the user one of the number of digits of the password for the next round of inputs, or the number of digits of the password for the current round, or the number of the rounds in which the inputs were incorrect.

11. A method for password verification on a computing device, the computing device comprising a processor, a memory, and an algorithm stored in the memory for executing the method by the processor, the method comprising steps of:
   (1) repeating steps of receiving a password input by a user and verifying a password with a preset password until the input password matches the preset password or the number of inputs reaches a preset maximum number of inputs, wherein, when the input password does not match the password, the computing device indicates to the user the number of digits of the password required for the next input or the number of digits of the password required for the current input;
   (2) when the number of inputs reaches the preset maximum number of inputs, elongating the preset password by a preset number of digits;
   (3) repeating steps of receiving an input password and verifying the password with the elongated preset password until the input password matches the elongated preset password or the number of inputs reaches the preset maximum number of inputs, wherein both the preset password and the elongated preset password contain one or more consecutive digits of the password; and
   (4) when the number of inputs reaches the preset maximum number of inputs, repeating steps (2) and (3) until the input password matches the elongated preset password or the number of repetitions of the steps (2) and (3) reaches a preset maximum number of repetitions.

12. The method according to claim 11, wherein the elongated preset password comprises the characters of the previous preset password and new characters.

13. The method according to claim 11, wherein the password is locked when the number of repetitions of the steps (2) and (3) reaches the preset maximum number of repetitions.

14. A computing device, comprising a processor, a memory, and an algorithm stored in the memory for execution by the processor, wherein the algorithm, when executed by the processor, executes a method comprising steps of:
   (1) repeatedly receiving an input password and verifying the password with a preset password until the input password matches the preset password or the number of inputs reaches a preset maximum number of inputs, wherein, when the input password does not match the preset password, the computing device indicates to the user the number of digits of the password required for the next input or the number of digits of the password required for the current input;
   (2) when the number of inputs reaches the preset maximum number of inputs, elongating the preset password by a preset number of digits;
   (3) repeatedly receiving an input password and verifying the password with the elongated preset password until the input password matches the elongated preset password or the number of inputs reaches the preset maximum number of inputs, wherein both the preset password and the elongated preset password contain one or more consecutive digits of the password; and
   (4) when the number of inputs reaches the preset maximum number of inputs, repeating steps (2) and (3) until the input password matches the elongated preset password or the number of repetitions of the steps (2) and (3) reaches a preset maximum number of repetitions.

* * * * *